3,317,554
2-ISOPROPYL-5(6)-CHLOROBENZIMIDAZOLE
Harry Goldsmith and Robert F. Crawford, La Mirada, Calif., assignors to United States Borax & Chemical Corporation, Los Angeles, Calif., a corporation of Nevada
No Drawing. Filed July 17, 1963, Ser. No. 295,828
1 Claim. (Cl. 260—309.2)

This invention relates to compositions and methods for controlling weed growth, and more particularly, to novel herbicidal compositions and methods utilizing substituted benzimidazoles as herbicides.

Benzimidazoles are heterocyclic compounds based on the structure

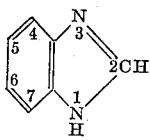

Those benzimidazoles possessing a free imino hydrogen (in the 1-position) are tautomeric systems and the derivatives not possessing a plane of symmetry can exist in two possible tautomeric forms. Thus, the 4- or 5-substituted benzimidazoles can also exist in the 7- or 6-substituted forms, respectively. Therefore, whenever a mono- or polysubstituted benzimidazole not possessing a plane of symmetry is named, it is usually referred to using both positions, as, for example, 5(6)-chlorobenzimidazole or 4(7)-chlorobenzimidazole. This system of nomenclature is followed in the following description and claims. Of course, substitution of the imino hydrogen eliminates the possibility for tautomerism, and a definite assignment of structure becomes possible.

An object of the present invention is to provide novel herbicidal compositions useful for controlling weed growth. It is also an object of this invention to provide methods of controlling weed growth by application of specific substituted benzimidazoles to said weeds. Other objects will become apparent from the following disclosure.

According to the present invention, there are provided herbicidal compositions and methods utilizing a compound of the formula

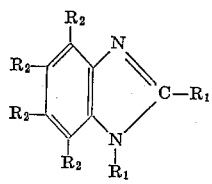

where each $R_1$ is selected from the group consisting of hydrogen and alkyl, and each $R_2$ is selected from the group consisting of hydrogen, halo, lower alkyl and lower alkoxy; when all $R_2$'s are hydrogen at least one of said $R_1$'s is alkyl.

It will be noted that the benzimidazoles of the present invention must have at least one substituent, either in the 1-, 2-, 4-, 5-, 6-, or 7-position of the compound. Thus, $R_1$ can represent an alkyl group, straight or branched chain, and preferably a lower alkyl group such as for example, methyl, ethyl, isopropyl, sec.-butyl, n-pentyl, n-hexyl, and n-octyl. The alkyl group can also be a cycloalkyl group such as cyclopentyl and cyclohexyl.

The substituents on the 4-, 5-, 6-, and 7-positions of the ring can be the same or different groups selected from halo, such as bromo, chloro and fluoro, lower alkyl, as illustrated above, or lower alkoxy, such as methoxy, ethoxy, isopropoxy, butoxy, and the like. Also included are compounds having no substituents on the aromatic ring but containing an alkyl substituent at either or both the 1- and 2-positions of the compound.

The following are typical examples of substituted benzimidazoles of this invention which are represented by the above formula:

5(6)-bromobenzimidazole
1-methylbenzimidazole
1-n-butylbenzimidazole
1-n-butyl-2-isopropyl-5-chlorobenzimidazole
2-methyl-5(6)-chlorobenzimidazole
4(7)-methylbenzimidazole
1-sec.-butylbenzimidazole
1-n-octylbenzimidazole
1,2-dimethylbenzimidazole
1-methyl-5-chlorobenzimidazole
2-methyl-5(6)-bromobenzimidazole
2-isopropyl-5(6)-chlorobenzimidazole
2-methyl-5(6)-methoxybenzimidazole
1-n-butyl-2-methylbenzimidazole
5(6)-chlorobenzimidazole
5(6)-methoxybenzimidazole
2-n-butyl-5(6)-chlorobenzimidazole
5,6-dichlorobenzimidazole
2-methylbenzimidazole
2,5(6)-dimethylbenzimidazole
1-methyl-7-chlorobenzimidazole
2-ethyl-5,6-dimethylbenzimidazole The presently preferred herbicidal compounds are the 2-lower alkyl-5(6)-substituted-benzimidazoles in which said 5(6)-substituent is bromo, chloro, or lower alkyl such as 2-methyl-5(6)-chlorobenzimidazole, 2-isopropyl-5(6)-chlorobenzimidazole, 2-sec.-butyl-5(6)-bromobenzimidazole, 2-n-butyl-5(6)-chlorobenzimidazole, 2-isopropyl - 5(6) - methylbenzimidazole, 2,5(6) - dimethylbenzimidazole and 2-n-propyl-5(6)-bromobenzimidazole.

The substituted benzimidazoles of this invention are readily prepared by reaction of substantially equimolar amounts of the appropriate ortho-phenylenediamine with an aliphatic carboxylic acid, preferably in the presence of a mineral acid, such as hydrochloric acid or polyphosphoric acid. The reaction takes place at elevated temperatures, such as in the range of about 80° to 120° C. Water is a suitable reaction medium since the desired product is generally insoluble in water and can be isolated readily by filtration or extraction of the neutralized reaction mixture. The desired product is purified by conventional procedures, such as recrystallization or distillation under reduced pressure.

The 1-alkyl benzimidazoles are readily prepared by reaction at elevated temperatures of the appropriate parent benzimidazole with a haloalkane in the presence of potassium carbonate, and preferably in a solvent medium such as an alcohol. The desired product is isolated and purified by conventional procedures well known to those skilled in the art.

The derivatives having bromo or chloro substituents on the aromatic ring can be prepared by the conventional halogenation of the parent benzimidazole in acetic acid according to procedures well known to those skilled in the art.

The substituted benzimidazoles of this invention are effective herbicidal compounds useful for controlling weed growth. "Weeds" as used herein is intended to include any plant growth which is undesirable. The compounds are useful as a pre-emergence or post-emergence treatment; that is, they can be used to kill growing plants or they can be used to kill or prevent the emergence of seedlings of weeds. Thus, the compounds can be used to control the growth of weeds by applying a phytotoxic amount to the locus of the weeds, that is, the foliage of the growing plants or soil in which the plants are growing or will grow.

An application rate in the range of about 0.25 to about 50 pounds of one or more of the active compounds per acre is generally an effective phytotoxic amount, although greater or lesser amounts can be used. The presently preferred application rate is in the range of about 1 to about 20 pounds per acre. At the lower application rates, such as less than about 10 pounds per acre, the compounds will selectively kill some species of plants without injury to other species.

The following examples are presented to illustrate the preparation of and herbicidal activity of typical compounds of this invention, but it is to be understood that the invention is not limited to the specific examples given.

EXAMPLE I

*2-isopropyl-5(6)-chlorobenzimidazole*

A solution prepared by adding 18.6 ml. (17.6 g.; 0.2 mole) of isobutyric acid to a filtered solution of 14.3 g. (0.1 mole) of 4-chloro-1,2-phenylenediamine in 100 ml. of 4-N aqueous hydrochloric acid was heated at reflux temperature for 4 hours. After cooling, the solution was neutralized with concentrated ammonium hydroxide. The mixture of crystalline solid and solidified oil that precipitated was separated, redissolved in 250 ml. of 4-N aqueous hydrochloric acid and reprecipitated by neutralization of the solution with concentrated ammonium hydroxide. The solid was collected by filtration, washed with water, dried, and recrystallized from ether. The product was a light yellow crystalline solid, M.P. 192°–194° C.

When 2-isopropyl-5(6)-chlorobenzimidazole was applied as a pre-emergence treatment at a rate of one pound of the active compound per acre, it gave a complete kill of pigweed and mustard without injury to cotton.

EXAMPLE II

*5(6)-methoxybenzimidazole*

A solution of 13.8 g. (0.1 mole) of 4-methoxy-1,2-phenylenediamine and 6.6 ml. of 88% formic acid (6.9 g., 0.15 mole) in 100 ml. of 4-N aqueous hydrochloric acid was refluxed for 4 hours. The solution was cooled and neutralized with concentrated ammonium hydroxide. An oil that separated was extracted into ether. The ether extract was washed with saturated sodium chloride solution and dried over anhydrous magnesium sulfate. After filtration and evaporation of ether from the filtrate, the residue was distilled under reduced pressure to give 7.05 g. (48% yield) of the desired product, B.P. 210°–216° C./0.4 mm. It solidified in the receiver to an ivory-colored solid, M.P. 118°–121° C.

When the compound was applied at a rate of 15 pounds per acre as a pre-emergence treatment, a complete kill of cucumber plants was obtained.

EXAMPLE III

*2-methyl-5(6)-methoxybenzimidazole*

The procedure of Example II was repeated except that 8.6 ml. (9.0 g.; 0.15 mole) of glacial acetic acid was used in place of the formic acid. The distilled product, B.P. 170° C./0.25 mm., solidified in the receiver to a light yellow solid, M.P. 137°–141° C. A yield of 7.8 grams (53%) was obtained.

When applied at a rate of 20 pounds per acre as a pre-emergence or post-emergence treatment the compound gave complete kill of mustard and cucumber plants.

EXAMPLE IV

*5(6)-chlorobenzimidazole*

A solution of 28.5 g. (0.2 mole) of 4-chloro-1,2-phenylenediamine in 200 ml. of 4-N aqueous hydrochloric acid was prepared and filtered. To the filtered solution was added 13.1 ml. of 88% formic acid (13.8 g.; 0.3 mole) and the resulting solution was heated at reflux for 2.5 hours. The solution was allowed to cool and was neutralized with concentrated ammonium hydroxide. A mixture of white solid and solidified oil that precipitated was collected and washed with water. After recrystallization from water, 10.3 g. (34%) of a white crystalline product, M.P. 120°–125° C. was obtained.

When applied at a rate of 15 pounds per acre as a pre-emergence treatment, millet, ryegrass and oats were killed with only a slight effect on peas.

EXAMPLE V

*4(7)-methylbenzimidazole*

4(7)-methylbenzimidazole was prepared by the reaction of 3-methyl-1,2-phenylenediamine with formic acid according to the procedure of Example IV. After recrystallization from pentane-ether, the crystalline product melted at 142°–149° C.

When the compound was applied as a pre-emergence or a post-emergence treatment at a rate of 25 pounds per acre, oats and cucumbers were killed.

EXAMPLE VI

*1-n-butylbenzimidazole*

A mixture of 23.6 g. (0.2 mole) of benzimidazole, 21.5 ml. (27.4 g.; 0.2 mole) of 1-bromobutane, 27.6 g. (0.2 mole) of potassium carbonate and 300 ml. of n-butanol was boiled until evolution of carbon dioxide ceased (11 hours). The butanol was removed from the reaction mixture by evaporation over a steam bath at reduced pressure (water aspirator) and the residue, a liquid-solid mixture, was treated with 300 ml. of water. Ether (300 ml.) was added to take up an oily layer that separated. The ether layer was separated, washed with 100 ml. of saturated sodium chloride solution and dried over anhydrous magnesium sulfate. After filtering, ether was removed from the filtrate by evaporation and the brown liquid residue was fractionally distilled at reduced pressure. 1-n-butylbenzimidazole, 16.2 g. (46%) of a clear, colorless liquid, was collected at 167°–180° C./1.2–3.0 mm.; $n_D^{23.5}$ 1.5616.

When applied as a pre-emergence or post-emergence teratment at a rate of 25 pounds per acre, millet, ryegrass, oats, and mustard were completely killed.

EXAMPLE VII

*2-methyl-5(6)-chlorobenzimidazole*

2-methyl-5(6)-chlorobenzimidazole, M.P. 199° C., can be prepared by the reaction of acetic acid with 4-chloro-1,2-phenylenediamine following the procedure of Example I.

When applied as a post-emergence treatment at a rate of 2 pounds per acre, the compound killed mustard, millet and pigweed without injury to corn and sorghum.

EXAMPLE VIII

*1-n-butyl-2-methylbenzimidazole*

The procedure of Example VI was repeated, except that 26.4 g. (0.2 mole) of 2-methylbenzimidazole was used in place of benzimidazole. Fractional distillation at reduced pressure gave the desired product, B.P. 162°–166° C./0.4–0.5 mm.; $n_D^{24}$ 1.5605.

When applied as a post-emergence treatment at a rate of 25 pounds per acre, the compound gave a complete kill of corn, millet, ryegrass, oats, peas, mustard, cucumbers and snap beans.

EXAMPLE IX

*2,5(6)-dimethylbenzimidazole*

2,5(6)-dimethylbenzimidazole, M.P. 202°–204.5° C., was prepared by the reaction of acetic acid with 4-methyl-1,2-phenylenediamine according to the procedure of Example I.

When the compound was applied as a pre-emergence or post-emergence treatment at a rate of 7.5 pounds per acre, a complete kill of peas, mustard, cucumbers, beans, oats, ryegrass and millet was obtained.

EXAMPLE X

2-methyl-5(6)-bromobenzimidazole

A solution of 10.67 g. (66.8 mmoles) of bromine in 10 ml. of acetic acid was added slowly to a solution of 8.81 g. (66.8 mmoles) of 2-methylbenzimidazole and 5.5 g. (66.8 mmoles) of sodium acetate in 50 ml. of acetic acid. The solution was stirred overnight at room temperature and then added to about 500 ml. of water. The aqueous solution was neutralized with sodium hydroxide and the precipitated solid material was removed by filtration. The crude product (11.24 g.; 79% yield) was recrystallized from methanol-water to give 2-methyl-5(6)-bromobenzimidazole, M.P. 211°–213° C.

When the compound was applied as a pre-emergence application at a rate of 30 pounds per acre, a complete kill of millet, mustard and ryegrass was obtained.

EXAMPLE XI

2-mehtyl-dibromobenzimidazole

2 - methyl - dibromobenzimidazole was prepared by bromination of 2 - methyl - 5(6) - bromobenzimidazole according to the procedure of Example X. After recrystallization from methanol-water, the product melted at 215°–217° C.

When the compound was applied as a pre-emergence or a post-emergence treatment at a rate of 6 pounds per acre, a complete kill of mustard, ryegrass, oats and millet was obtained.

EXAMPLE XII

1-methyl-7-chlorobenzimidazole 3-chloro-2-methylaminoaniline (16.1 g., 0.103 mole) was suspended in 200 ml. of 2 N hydrochloric acid. Addition of 7.8 g. (0.15 mole) of 88% formic acid created a homogeneous solution. The solution was refluxed for 2 hours, cooled, and adjusted to pH 8 with concentrated ammonium hydroxide, causing precipitation of a brown solid. This solid was recrystallized from methylene chloride-petroleum ether to give 1-methyl-7-chlorobenzimidazole, M.P. 168°–170° C.

When applied as a pre-emergence treatment at an application rate of 12 pounds per acre, a complete kill of cucumbers was obtained.

EXAMPLE XIII

5(6)-bromobenzimidazole 4-bromo-1,2-phenylenediamine is reacted with formic acid according to the procedure of Example IV to give 5(6)-bromobenzimidazole, M.P. 131°–132° C.

When applied as a pre-emergence treatment at a rate of 15 pounds per acre, a complete kill of mustard, millet and cucumbers was obtained.

EXAMPLE XIV

2-ethyl-5,6-dimethylbenzimidazole 4,5-dimethyl-1,2 - phenylenediamine is reacted with propionic acid according to the procedure of Example I to give 2-ethyl-5,6-dimethylbenzimidazole, M.P. 219°–222° C.

When applied as a post-emergence treatment at a rate of 20 pounds per acre, a complete kill of oats, mustard, ryegrass and peas was obtained.

EXAMPLE XV

2-isopropyl-5(6)-methylbenzimidazole 4-methyl-1,2-phenylenediamine was reacted with isobutyric acid according to the procedure of Example I to give 2-isopropyl-5(6)-methylbenzimidazole, M.P. 154°–157° C.

When applied as a pre-emergence or a post-emergence treatment at a rate of 12 pounds per acre, the compound gave a complete kill of mustard, snapbeans and ryegrass.

EXAMPLE XVI

2-n-propyl-5(6)-chlorobenzimidazole

A mixture of 14.3 g. (0.1 mole) of 4-chloro-1,2-phenylenediamine, 9.4 ml. (0.101 mole) of n-butyric acid and 150 g. of polyphosphoric acid was heated in an oil bath at 125° C. for 4 hours. The reaction mixture was cooled and 200 ml. of water was added. The mixture was stirred and neutralized with concentrated ammonium hydroxide. The insoluble solids were collected by filtration, washed with water and recrystallized from water to give the product, a white solid, M.P. 135°–136° C.

When applied as a pre-emergence or a post-emergence treatment at a rate of 25 pounds per acre, a complete kill of snapbeans, oats, millet, ryegrass and mustard was obtained.

Since a relatively small amount of the active substituted benzimidazole should be uniformly distributed over the area to be treated, the compounds preferably are formulated with conventional carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, Diesel oil, xylene, benzene, naphthalene, glycols, and the like. A surfactant preferably is included to aid in dispersion, emulsification and coverage. The surfactant can be ionic or non-ionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salts of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trade names and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain about 5 to about 99 percent by weight of the active substituted benzimidazole with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

Since many of the substituted benzimidazoles having an active H at the 1-position will form salts, such as the metal and ammonium salts, they can be formulated and used in their salt form. The alkali metal salts, such as the sodium salt, are particularly useful.

The herbicidal compositions can include other beneficial adjuvants, such as humectants, oils and contact agents. Also, other herbicides, such as sodium chlorate and the sodium borates, 2,3,6-trichlorobenzyloxypropanol, the chlorophenoxyacetic acids, substituted ureas, trichlorobenzoic acids, triazines, uracils and carbamates, can be included in the formulations.

The following examples are presented to illustrate suitable herbicidal compositions of this invention, but the invention is not to be considered limited to the specific examples given.

EXAMPLE XVII

| | Percent |
|---|---|
| Granular attapulgite clay | 90 |
| 2-methyl-5(6)-chlorobenzimidazole | 5 |
| Diesel oil | 5 |

The powdered benzimidazole is mixed uniformly on the granular clay by tumbling in a rotary mixer. Diesel oil is sprayed onto the mixture, adhering the compound to the clay. The resulting granular formulation can be applied by hand or by mechanical spreader to the soil or plants.

EXAMPLE XVIII

| | Percent |
|---|---|
| 1-n-butylbenzimidazole | 15 |
| Alkylarylpolyethyleneglycol surfactant | 5 |
| Ethylene glycol | 40 |
| Isopropanol | 40 |

The above liquid formulation can be diluted with water to form an emulsion and the emulsion sprayed with conventional spray equipment on soil or plants.

EXAMPLE XIX

| | | |
|---|---|---|
| 5(6)-chlorobenzimidazole as sodium salt | lb | 0.2 |
| Polyoxyethylenesorbitan monolaurate | lb | 0.005 |
| Water | gallon | 1 |

The above formulation can be sprayed with conventional spray equipment. At a level of 100 gal./a., the formulation will apply 20 lbs./a. of 5(6)-chlorobenzimidazole to plants or to soil.

EXAMPLE XX

Certain benzimidazoles are especially amenable to formulation with sodium borates or borate-chlorates because the benzimidazoles form sodium salts in alkaline solutions.

| | Percent by weight |
|---|---|
| 2-methyl-5(6)-methoxybenzimidazole | 4 |
| Polyglycerol ester of stearic acid | 0.2 |
| Sodium metaborate | 95.8 |

The above formulation can be prepared by coating powdered 2-methyl-5(6)-methoxybenzimidazole on granular sodium metaborate (−25 +80 mesh), or by pelletizing the uniform mixture of components. The product can be applied as a dry granular solid, or dissolved in water and sprayed with conventional spray equipment on the plant foliage or soil.

EXAMPLE XXI

| | | |
|---|---|---|
| 2-methyl-5(6)-methylbenzimidazole | lb | 0.1 |
| Alkylarylpolyethyleneglycol | lb | 0.002 |
| Anhydrous sodium metaborate | lb | 1.0 |
| Sodium chlorate | lb | 0.7 |
| Water | gallon | 1 |

The above liquid formulation can be prepared by dissolving the components in water. The solution can be sprayed with conventional spray equipment on plant foliage or soil.

EXAMPLE XXII 2-n-butyl-5(6)-chlorobenzimidazole can be dissolved in a petroleum hydrocarbon weed oil at a level of 0.15 lbs./gal. of oil. The formulation, when sprayed on vegetation at a rate of 100 gal./a., will apply 15 lbs./a. of 2-n-butyl-5(6)-chlorobenzimidazole.

Other modes of applying the principle of the invention may be employed, change being made as regards the details described, provided the features stated in the following claim or the equivalent of such be employed.

We, therefore, particularly point out and distinctly claim as our invention:

2-isopropyl-5(6)-chlorobenzimidazole.

References Cited by the Examiner
UNITED STATES PATENTS

| | | | |
|---|---|---|---|
| 2,004,864 | 6/1935 | Graenacher et al. | 260—309.2 |
| 2,312,923 | 3/1943 | Martin et al. | 260—309.2 |
| 2,719,783 | 10/1955 | Kohn | 71—2.5 |
| 2,719,784 | 10/1955 | Kohn | 71—2.5 |
| 2,778,823 | 1/1957 | Brooker et al. | 260—309.2 |
| 2,782,204 | 2/1957 | Tenenbaum | 260—309.2 |
| 2,876,233 | 3/1959 | Herrling et al. | 260—309.2 |
| 2,965,648 | 12/1960 | Wiegand et al. | 260—309.2 |

OTHER REFERENCES

Abbott et al., Proc. Soc. Exper. Biol. Med., vol. 96, pages 846–49 (1957).

Davies et al., Jour. Pharm. Pharmacol., vol. 4, pages 453–55 relied on (1952).

Reilly et al., Jour. Chem. Soc. (London), vol. 115, pages 175–81 (1919).

Simonov et al., Zhurnal Obshchei Khimii, vol. 31, pages 3970–74 (1961). Abstracted in Chemical Abstracts, vol. 57, columns 8559–60 (1962).

Weidenhagen et al., Berichte, vol. 75, pages 1943–44 relied on (1942).

WALTER A. MODANCE, Primary Examiner.

JOHN D. RANDOLPH, NICHOLAS S. RIZZO, Examiners.

NATALIE TROUSOF, Assistant Examiner.